United States Patent
Sakai et al.

(10) Patent No.: US 7,393,128 B2
(45) Date of Patent: Jul. 1, 2008

(54) PLANAR LIGHT SOURCE DEVICE AND DISPLAY DEVICE USING THE SAME

(75) Inventors: Seiji Sakai, Tokyo (JP); Toshiyuki Yoneda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 156 days.

(21) Appl. No.: 11/400,230

(22) Filed: Apr. 10, 2006

(65) Prior Publication Data

US 2006/0262530 A1     Nov. 23, 2006

(30) Foreign Application Priority Data

May 23, 2005    (JP)   ............................ 2005-148992

(51) Int. Cl.
*F21V 7/04* (2006.01)
(52) U.S. Cl. ............................ 362/613; 362/97; 349/68
(58) Field of Classification Search ......... 362/612–613, 362/600, 231, 276, 802; 349/68, 65
See application file for complete search history.

(56) References Cited

U.S. PATENT DOCUMENTS

| | | | | |
|---|---|---|---|---|
| 6,069,676 A | * | 5/2000 | Yuyama | 349/62 |
| 6,630,801 B2 | * | 10/2003 | Schuurmans | 315/307 |
| 6,964,500 B2 | | 11/2005 | Sakai | |
| 2003/0189211 A1 | | 10/2003 | Dietz | |
| 2004/0245438 A1 | * | 12/2004 | Payne et al. | 250/221 |
| 2006/0097978 A1 | * | 5/2006 | Ng et al. | 345/102 |
| 2006/0262530 A1 | | 11/2006 | Sakai et al. | |
| 2007/0086071 A1 | * | 4/2007 | Gila et al. | 358/518 |
| 2007/0098433 A1 | * | 5/2007 | Yano et al. | 399/88 |

FOREIGN PATENT DOCUMENTS

| | | |
|---|---|---|
| CN | 1514992 A | 7/2004 |
| JP | 11-260572 | 9/1999 |
| JP | 2004-21147 | 1/2004 |
| JP | 2004-199968 | 7/2004 |
| JP | 2005-71702 | 3/2005 |

OTHER PUBLICATIONS

U.S. Appl. No. 11/609,488, filed Dec. 12, 2006, Sakai et al.

* cited by examiner

*Primary Examiner*—Ali Alavi
(74) *Attorney, Agent, or Firm*—Oblon, Spivak, McClelland, Maier & Neustadt, P.C.

(57) ABSTRACT

A planar light source device includes a light source section having a plurality of light emitting diodes as a light source, and a light guiding plate guiding light from the light source section to emit planar light. The light emitting diodes being turned off detect the quantities of light from the other light emitting diodes, and adjust the quantities of light emission of the other light emitting diodes based on the detected quantities of light.

12 Claims, 6 Drawing Sheets

THERMAL EQUILIBRIUM STATE

FORWARD BIAS

PLANAR LIGHT SOURCE DEVICE AND DISPLAY DEVICE USING THE SAME

BACKGROUND OF THE INVENTION

1. Field of the Invention

The present invention relates to planar light source devices and display devices using the same, and particularly to planar light source devices using light emitting diodes and display devices using the same.

2. Description of the Background Art

As a planar light source device having a light emitting diode (LED) as a light source, a backlight of a liquid crystal display device used in a personal computer and the like has been conventionally well known. This planar light source device includes a light guiding plate for confining light, and a light source section. The light guiding plate is made of resin that is transparent and has a high refractive index, such as polycarbonate resin or acrylic resin. A light emission section is formed by mounting a plurality of LEDs on a substrate, and is arranged on opposite side surfaces of the light guiding plate.

In order to obtain stabilized luminance with this device, it is further required that a sensor be used to measure the quantities of light from the LEDs, and the quantities of light emission of the LEDs be adjusted by utilizing the results of measurements. For this reason, a planar light source device disclosed in Japanese Patent Application Laid-Open No. 11-260572 (1999) has a particular optical sensor provided on the end face of a light guiding plate, to adjust the quantities of light emission of LEDs serving as a light source by utilizing the results detected by the sensor.

When using LEDs as a light source like the planar light source device disclosed in Japanese Patent Application Laid-Open No. 11-260572, the outputs of the LEDs have strong temperature dependence, causing chromaticity and luminance to vary with a change in ambient temperature. The temperature dependences of LED outputs vary depending on colors of red (hereafter also indicated as R), green (hereafter also indicated as G), and blue (hereafter also indicated as B). Accordingly, a problem is encountered in the emission of white light by using LEDs of the three colors R, G and B such that a white balance varies with a change in ambient temperature. The light emission characteristics of LEDs vary among LEDs of the same color as well. Further, the life characteristics of LEDs also vary depending on the colors, so the range of variation in light emission characteristics of LEDs grows wider among the colors due to age deterioration.

In order to solve the above-discussed problems, the particular optical sensor detects variations in chromaticity and luminance of the LEDs caused by temperature changes and age deterioration, and the quantities of light emission of the LEDs are adjusted based on the detected results in Japanese Patent Application Laid-Open No. 11-260572. It has thus been required of conventional planar light source devices to include an additional particular optical sensor.

However, the provision of an additional particular optical sensor for a planar light source device involves increases in component count and the number of steps of the device, increasing the manufacturing cost. Further, the addition of an optical sensor, which is expensive in itself, increases the cost for the planar light source device itself.

SUMMARY OF THE INVENTION

It is an object of the present invention to provide a planar light source device capable of obtaining stabilized quantities of light emission of light emitting diodes without having to use a particular optical sensor, and a display device using the same.

A planar light source device includes a light source section having a plurality of light emitting diodes as a light source, and a light guiding section guiding light from the light source section to emit planar light. The light emitting diodes being turned off detect the quantities of light from the other said light emitting diodes, and adjust the quantities of light emission of the other said light emitting diodes based on the detected quantities of light.

In this planar light source device, the light emitting diodes being turned off detect the quantities of light from the other said light emitting diodes, and adjust the quantities of light emission of the other said light emitting diodes based on the detected quantities of light. This attains stabilized quantities of light emission of the light emitting diodes without having to use a particular optical sensor, to thereby realize a planar light source device having stabilized luminance and chromaticity.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
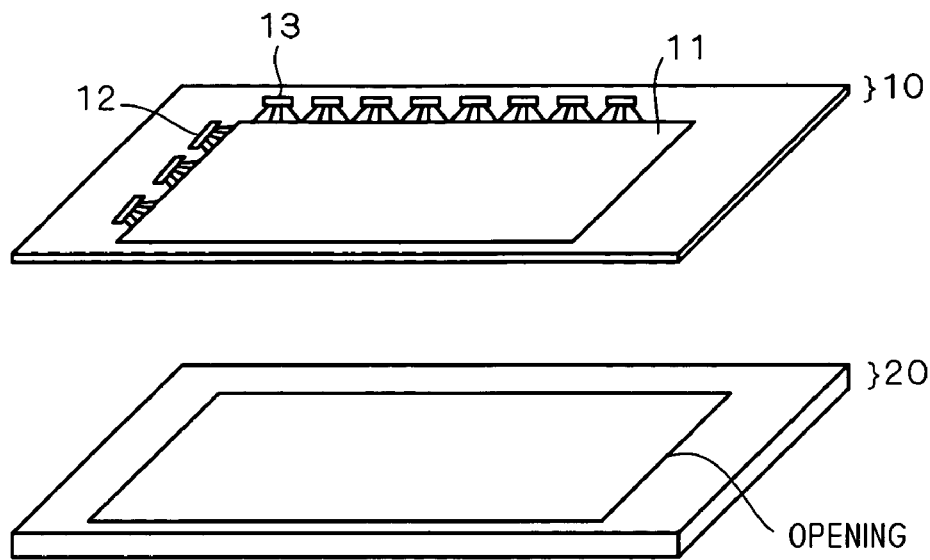
FIG. 1 is a perspective view illustrating a liquid crystal display device according to a first preferred embodiment of the present invention.

A first preferred embodiment of the present invention will be described based on an embodiment using a planar light source device as a backlight of a liquid crystal display device. Yet a planar light source device according to the present invention is not restricted to this embodiment. FIG. 1 is an exploded perspective view illustrating the structure of a liquid crystal display device according to the first preferred embodiment. This liquid crystal display device includes a liquid crystal display panel 10 writing a desired image to pixels for display, and a backlight 20 irradiating light from the back of the liquid crystal display panel 10. A liquid crystal is held between the liquid crystal display panel 10 and an opposed substrate 11, and TFTs (thin film transistors) are formed in a matrix (not shown) on one side of the substrate 11 to drive the liquid crystal. Pixels connected to the TFTs are also formed in a matrix (not shown). The liquid crystal display panel 10 according to the first preferred embodiment is a transmission liquid crystal display device.

The liquid crystal display panel 10 includes a plurality of gate-line-driving-drivers 12 for turning on/off the TFTs provided on a pixel-by-pixel basis, and a plurality of source-line-driving-drivers 13 for supplying image data to the pixels via the TFTs. The gate-line-driving-drivers 12 and source-line-driving-drivers 13 are separately formed as a semiconductor chip, for example, and then mounted on the substrate 11. The gate-line-driving-drivers 12 and source-line-driving-drivers 13 are controlled by a controller which is not shown, and write image data to the pixels. The writing of image data to the pixels is done based on image signals input to the controller. Signals for turning the TFTs on with a predetermined scanning period are supplied to gate lines (not shown) provided on the substrate 11, and image data is supplied from source lines (not shown) provided on the substrate 11 with that timing to write image data to the pixels.

Figure 2:
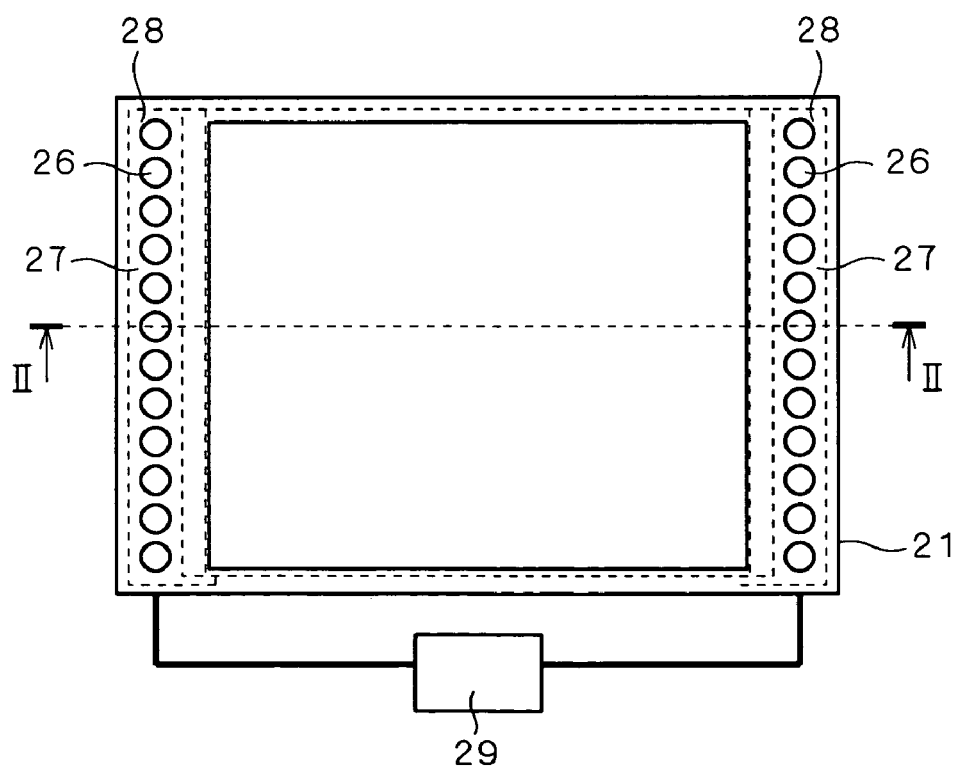
FIG. 2 is a plan view illustrating a planar light source device according to the first preferred embodiment.
Figure 3:
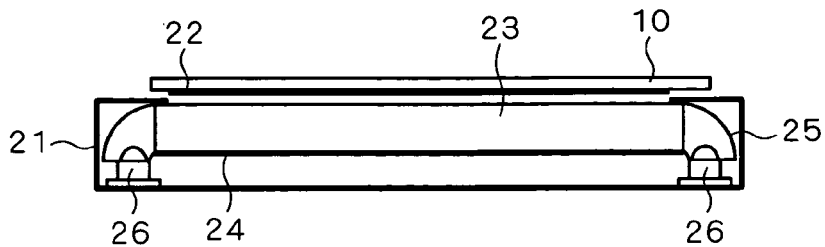
FIG. 3 is a cross-sectional view illustrating the planar light source device according to the first preferred embodiment.
Figure 4:
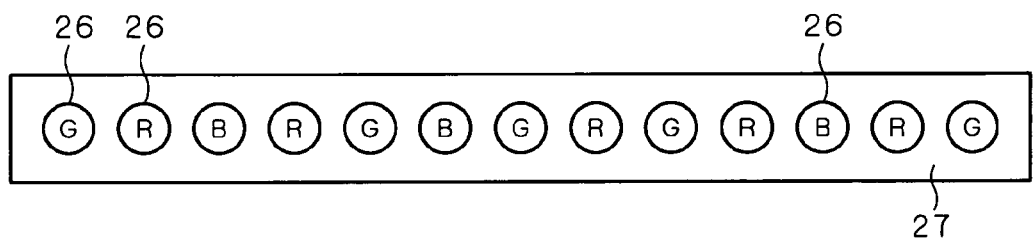
FIG. 4 is a plan view illustrating a light source unit according to the first preferred embodiment.
Figure 5:
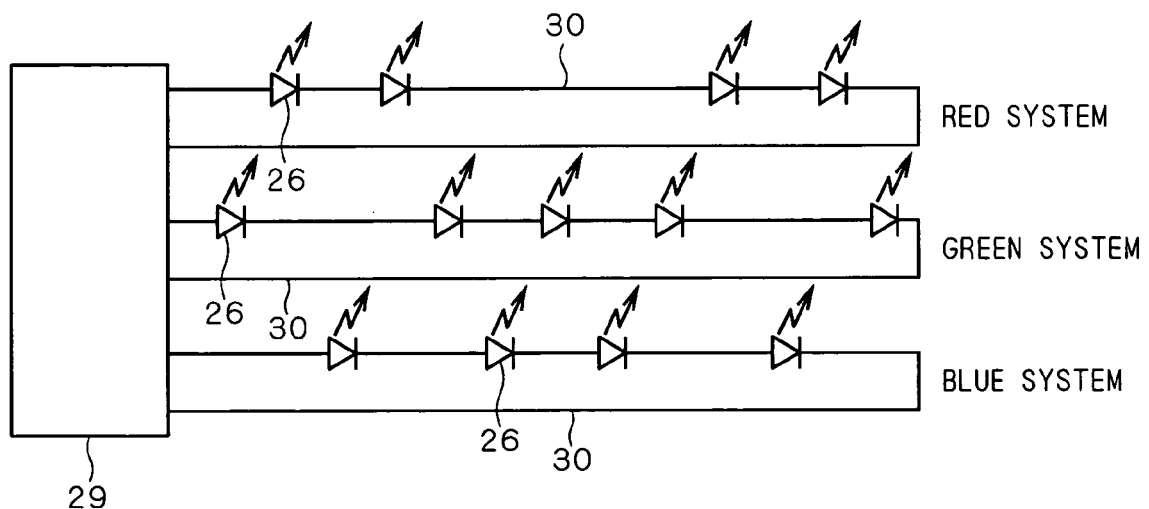
FIG. 5 is a wiring diagram illustrating the light source unit according to the first preferred embodiment.

The backlight 20 is a planar light source device emitting uniform light from an opening formed in a case, and is arranged on the back side of the liquid crystal display panel 10, as indicated in FIG. 1. FIG. 2 is a plan view illustrating the structure of the backlight 20. FIG. 3 is a cross-sectional view taken along the line II-II in FIG. 2. FIG. 4 illustrates an example of a light source section in which a plurality of LEDs are arranged in a row. FIG. 5 is a schematic wiring diagram of the light source section.

As illustrated in FIG. 3, the backlight 20 includes a case 21, an optical sheet 22, a light guiding plate 23, a reflection sheet 24, a reflector 25, and light emitting diodes 26. The case 21 is a frame for storing and holding the components of the backlight 20, and is made of synthetic resin or metal of excellent strength and workability. It is particularly desirable that aluminum or copper of excellent thermal conductivity be used for the case 21 in terms of dissipation of heat that is generated with the emission of the LEDs 26. The front of the case 21 is provided with an opening for emitting light from a light source section (LEDs 26).

The optical sheet 22 is a translucent sheet-like optical material such as a diffusion sheet for diffusing light, or a prism sheet having a prism row formed thereon. The term "diffusion sheet" used herein shall mean a sheet that is formed by roughening the surface of a synthetic resin or a transparent material such as a glass, and mixing a fine reflection part therein. A plurality kinds of a plurality of optical sheets 22 are used in combination to adjust a luminance value of emitted light. The optical sheet 22 is arranged on the front side of the light guiding plate 23.

The light guiding plate 23 is an optical material for guiding light from the light source section arranged on the short sides thereof, to emit planar light to the front side on which the liquid crystal display panel 10 is provided. The light guiding plate 23 is a translucent plate-like material such as an organic resin material (which includes acrylic resin and polycarbonate resin) or a glass. A diffusion pattern (not shown) is formed on the back side of the light guiding plate 23. This diffusion pattern is optical means for diffusing light transmitted through the light guiding plate 23, to emit uniform light to the front side.

More specifically, the diffusion pattern may be formed on the back side of the light guiding plate 23 by screen-printing a white pigment containing titanium oxide and the like on the back of the light guiding plate 23, or alternatively by forming a circular, or conical, or square fine pattern upon forming the light guiding plate 23. Luminance distribution in a direction parallel to the long side of the light guiding plate 23 can be rendered desired distribution by adjusting the diffusion pattern. Namely, the concentration, shape, dimensions, depth, and the like of the diffusion pattern are determined in such a manner as to optimize luminance distribution of the light emitted from the light source section.

The light source section includes light-emitting elements such as the LEDs 26 and laser diodes (LDs) that are capable of quick-response of sub-several-ns. In the light source section according to the first preferred embodiment, a plurality of LEDs each emitting a single color are combined and arranged in a row.

Also in the light source section according to the first preferred embodiment, as illustrated in FIG. 2, a plurality of LEDs 26 are arranged on a circuit substrate 27 to form one light source unit 28. The light source unit 28 is arranged on each short side of the light guiding plate 23, and is driven and controlled by a driver 29.

As illustrated in FIG. 4, the light source unit 28 has the LEDs 26 each emitting a single color of red (R), green (G) and blue (B) arranged in a row on the rectangular circuit substrate 27. The respective numbers of the R, G and B LEDs 26 need not be equal, but may be determined in such a manner that light attains desired white chromaticity upon passing through the liquid crystal display panel 11. Such combination of a plurality of LEDs 26 each emitting a single color and adjustment of the quantity of light for each of the LEDs can easily vary the chromaticity of light emitted from the backlight 20.

In addition, the LEDs 26 each emitting a single color of R, G and B possess higher luminous efficiency than an LED 26 emitting white light. By bringing the transmission characteristic of each color (R, G and B) of a color filter used in the liquid crystal display device into agreement with the emission spectrums of the LEDs 26, the color reproducibility of the liquid crystal display device can be improved. Further, each color is independently controllable with the LEDs 26 each emitting a single color of R, G and B, so the color shade of emitted light can be easily varied compared with the LEDs 26 emitting white light. The circles indicating the LEDs 26 in FIG. 4 are respectively labeled with "R", "G" and "B" to indicate their colors.

In the wiring diagram of the light source unit 28 illustrated in FIG. 5, the R, G and B LEDs 26 are connected in series on a color-by-color basis. Such serial connection is established because the quantities of light can be made uniform among the LEDs 26 of the same color by driving the LEDs 26 with a constant current. Wiring 30 connected to the LEDs 26 is formed of a copper pattern on the circuit substrate 27. The LEDs 26 are connected to the driver 29 via the wiring 30 on the circuit substrate 27, to be driven and controlled by the driver 29.

The reflector 25 shown in FIG. 3 covers the light source section except on the end face side of the light guiding plate 23, and efficiently lets the light from the light source section reflect off the end face side of the light guiding plate 23. The reflector 25 includes a metal plate having a reflection layer formed of silver or aluminum or the like, a resin sheet having silver or aluminum or the like deposited thereon, and a white resin sheet. It is desired that the reflector 25 have a reflectivity of at least 90% in order to minimize losses on the reflection surface.

The back of the light guiding plate 23 is provided with the reflection sheet 24 for reflecting the light from the light guiding plate 23 off the front side. The reflection sheet 24 is a sheet-like optical material that includes a plate having silver or aluminum or the like deposited thereon, and a white resin sheet. It is desired that the reflection sheet 24 have a reflectivity of at least 90% in order to efficiently emit the light from the light source section to the liquid crystal display panel 10.

The light source units 28 are provided on the short sides of the light guiding plate 23, with the R, G and B LEDs 26 being arranged in a row. The light source units 28 are driven independently of each other by the driver 29.

Next, light emission, light transmission, and light reception (detection of the quantity of light) of the planar light source device according to the first preferred embodiment will be described with reference to the cross-sectional view of the backlight 20 illustrated in FIG. 3. The light emission of the planar light source device according to the first preferred embodiment starts with the light emission of the LEDs 26 of one of the light source units 28 driven by the driver 29. The light emitted from the light source unit 28 enters the light guiding plate 23 directly or after being reflected by the reflector 25. The light is then transmitted through the light guiding plate 23 by being reflected repeatedly between the front and back of the light guiding plate 23. A large portion of the light transmitted through the light guiding plate 23 is diffused by the diffusion pattern formed on the back side of the light guiding plate 23. The diffused light is emitted from the front of the light guiding plate 23 directly or after being reflected by the reflection sheet 24, to enter the back of the liquid crystal display panel 10.

The light transmitted through the light guiding plate 23 without being diffused by the diffusion pattern is emitted from the end face of the light guiding plate 23 opposite to the end face of the light guiding plate 23 through which the light has entered. The light emitted from the end face of the light guiding plate 23 enters the other light source unit 28 directly or after being reflected by the reflector 25. The light is then received by the R, G and B LEDs 26 which detect the quantity of the light. The light source unit 28 according to the first preferred embodiment, which is provided with a plurality of R, G and B LEDs 26 as shown in FIG. 4, can increase the quantity of light to be detected, thus improving detection sensitivity. In addition, the LEDs 26 which are linearly arranged on the end face of the light guiding plate 23 can detect averaging light of the whole surface of the light guiding plate 23, resisting partial unevenness in luminance and color.

Figure 6A:
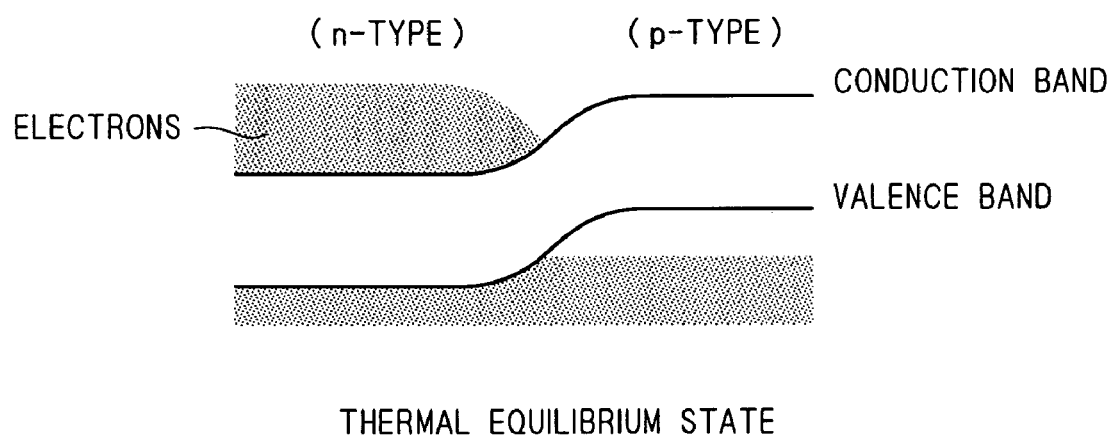
FIGS. 6A and 6B explain the operation of a light emitting diode according to the first preferred embodiment.
Figure 6B:
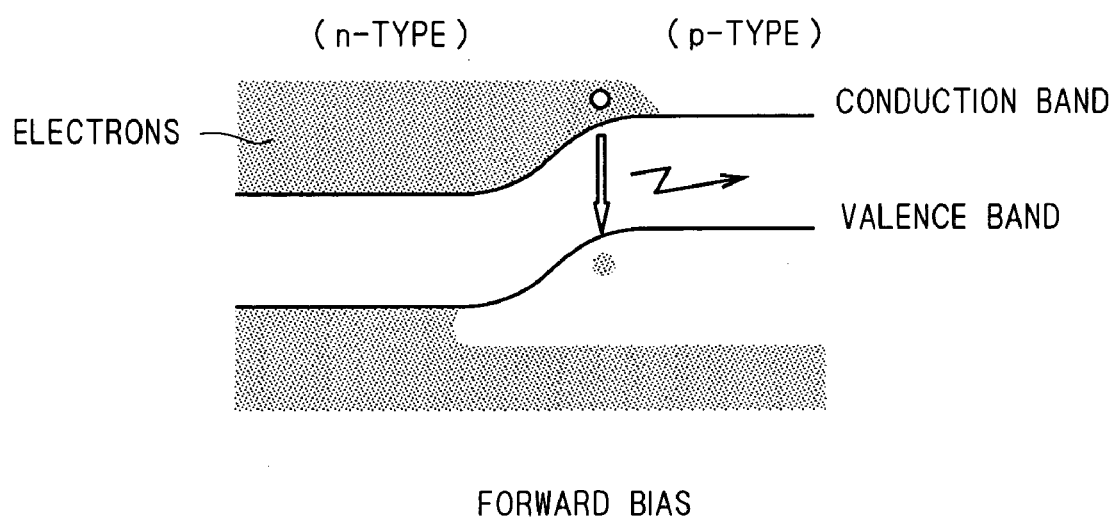

In such ways, the planar light source device according to the first preferred embodiment uses the LED 26 as a light-emitting element and also as a light-receiving element during turn-off. The operating principles of using the LED 26 as a light-emitting element or light-receiving element are now described. When using the LED 26 as a light-emitting element, with the LED 26 being in thermal equilibrium as illustrated in FIG. 6A, electrons leaning to an n-type semiconductor are hard to move to a p-type semiconductor due to a high energy barrier. Yet when a forward biased voltage is applied to the LED 26 as illustrated in FIG. 6B, the electrons leaning to the n-type semiconductor move to the p-type semiconductor more easily due to a lowered energy barrier. Consequently, the electrons in the n-type semiconductor move from the conduction band of high energy level to the valence band of low energy level, to recombine with holes near the valence band. Energy that has been lost upon the recombination is emitted as light, causing the LED 26 to emit light.

Conversely, although not shown, when light is externally irradiated to the LED 26 and the energy of the light is greater than the energy difference (namely, band gap energy) between the conduction and valence bands, electrons in the valence band are excited toward the conduction band, leaving holes in the valence band. Such electron-hole pair is generated everywhere in the n-type semiconductor, p-type semiconductor, and a depletion layer. In the depletion layer, the electrons are accelerated toward the n-type semiconductor and the holes toward the p-type semiconductor, respectively, due to an electric field. The electrons of the electron-hole pairs generated in the n-type semiconductor remain in the conduction band of the n-type semiconductor together with the electrons that have moved from the p-type semiconductor, while the holes of the electron-hole pairs generated in the n-type semiconductor are diffused up to the depletion layer, accelerated, and move to the valence band of the p-type semiconductor.

In this manner, the electron-hole pairs are generated in proportion to the quantity of incident light in the LED 26, and accumulated in both the n-type and p-type semiconductors. Consequently, the p-type semiconductor becomes positively charged and the n-type semiconductor becomes negatively charged, causing the electrons in the n-type semiconductor and the holes in the p-type semiconductor to flow to the opposite electrode, respectively, to thereby generate a current. The LED 26 can detect the quantity of received light by measuring this current. When a reverse biased voltage is applied to the LED 26, the relationship between the quantity of incident light and output current becomes linear, to improve the upper limit range. This increases the range of measurable illuminance.

It is understood from the above that the LED 26 acts as a light-emitting element when applied with a forward biased voltage, and acts as a light-receiving element during turn-off or when applied with a reverse biased voltage.

In the LED 26 as a light-receiving element, the energy of light generated when the electrons drop from the conduction band to the valence band increases with an increase in energy difference (band gap energy) between the conduction and valence bands of the p-type semiconductor. In addition, the color of light varies with a wavelength, so the greater the light energy, the shorter the wavelength of light emitted. Thus when the R, G and B LEDs 26 are used as in this preferred embodiment, a dominant wavelength increases in the order of B, G and R, and the band gap energy increases in the order of R, G and B.

A light electromotive force is generated in the LED 26 as a light-receiving element only when the absorbed light energy is greater than the band gap energy Eg of the light-receiving element, as discussed above. With regard to this, it is generally known that the relationship between the threshold wavelength λh [nm] of light-receiving sensitivity characteristic and the band gap energy Eg [eV] is expressed by the equation, $$\lambda h = 1240/Eg.$$

When using the R, G and B LEDs 26 as in this preferred embodiment, with the band gap energy Eg increasing in the order of R, G and B, the threshold wavelength λh increases in the order of B, G and R. Since incident light of short wavelength is absorbed at a sharply increasing rate into a diffusion layer in the surface of the LED 26, the sensitivity of the LED 26 becomes higher when the diffusion layer is thinner and a pn junction is closer to the surface. With the light-receiving sensitivity characteristic of the LED 26 depending on the R, G and B colors as described above, when light of some wavelength enters the light source unit 28, not only the luminance but also the chromaticity of the incident light can be obtained.

It is necessary, however, to apply a reverse biased voltage to the R, G and B LEDs 26 to calculate voltage fluctuations, to obtain the chromaticity.

The driver 29 connected to the light source units 28 adjusts the quantities of light emission of the LEDs 26 acting as light-emitting elements based on the quantities of light detected by the LEDs 26 acting as light-receiving elements. The light source units 28 are controlled independently of each other by the driver 29 with respect to the turn-on/off of the LEDs 26. A time period of turning one of the light source units 28 on includes a time period of turning the other light source unit 28 off, during which a reverse biased voltage is applied to the LEDs 26 of the other light source unit 28, causing the LEDs 26 to act as light-receiving elements.

The quantity of light emission can be adjusted by increasing or decreasing the current or voltage input to the LED 26, and a duty ratio. When a reduction in the quantity of red (R) light is determined based on the results detected by the LEDs 26 acting as light-receiving elements, for example, the driver 29 increases the quantities of light emission of the R LEDs 26 among the LEDs 26 acting as light-emitting elements. Such feedback control allows the luminance and chromaticity of emitted light to be maintained uniform in the planar light source device according to the first preferred embodiment.

Figure 7A:
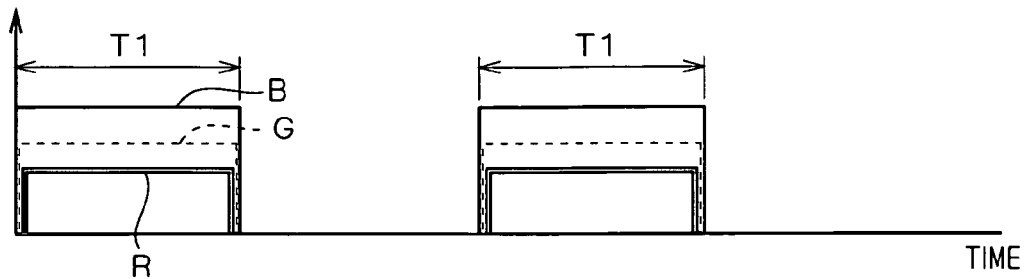
FIGS. 7A and 7B illustrate timing of turning on the light source unit according to the first preferred embodiment.
Figure 7B:
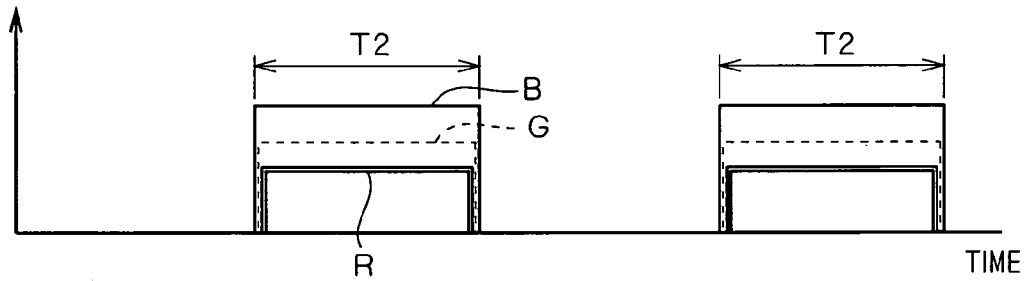

FIGS. 7A and 7B illustrate timing of turning on the planar light source device according to the first preferred embodiment. This is one example of turn-on timing when two light source units 28 are provided, with FIG. 7A indicating timing of turning the left light source unit 28 (hereafter also indicated as a light source unit 28L) on in FIG. 2, and FIG. 7B the right light source unit 28 (hereafter also indicated as a light source unit 28R). The R, G and B LEDs are separately illustrated in FIGS. 7A and 7B.

The operation of the planar light source device according to the first preferred embodiment will now be described with reference to FIGS. 7A and 7B. First, only the light source unit 28L is turned on for a time period T1. Namely, the time period T1 is provided during which the light source unit 28L is turned on while the light source unit 28R is turned off. Then, a time period T2 is provided during which the light source unit 28L is turned off while the light source unit 28R is turned on. The driver 29 drives the light source units 28L and 28R by repeating the time periods T1 and T2. The light source units 28 have a turn-on frequency f that is expressed by the equation, f=1/(T1+T2). It is required that the frequency be at least 60 Hz in order to eliminate flicker by visual inspection, preferably at least 120 Hz.

The above-described allocation of the time periods T1 and T2 can be freely changed. That is, when the total quantity of light of the light source unit 28R is larger than the total quantity of light of the light source unit 28L, with the time periods T1 and T2 being equal, the vicinity of the light source unit 28R grows lighter, causing unevenness in luminance and color. In such a case, the total quantities of light are rendered equal between the light source units 28L and 28R by providing the time period T1 longer than the time period T2, to thereby suppress the occurrence of unevenness in luminance and color.

By turning the light source units 28L and 28R on in an alternating manner, the LEDs 26 of the light source unit 28L act as light-emitting elements and the LEDs 26 of the light source unit 28R act as light-receiving elements for the time period T1. The roles are reversed for the time period T2. When driving the light source units 28 in such manner as is illustrated in FIGS. 7A and 7B, a period of time during which the LEDs 26 are turned on lasts less than half compared with when the LEDs 26 are turned on all the time. Accordingly, in this preferred embodiment, a current about twice as large as ordinary current is passed through the LEDs 26 to render the luminance of emitted light of the planar light source device equal to the luminance when the LEDs 26 are turned on all the time. With this, the LEDs 26 can be driven with power consumption equal to that when the LEDs 26 are turned on all the time without having to increase the number of LEDs 26.

Figure 8A:
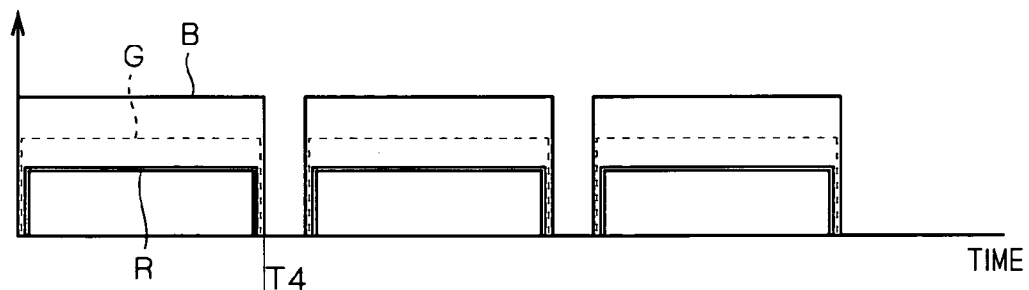
FIGS. 8A and 8B illustrate alternative timing of turning on the light source unit according to the first preferred embodiment.
Figure 8B:
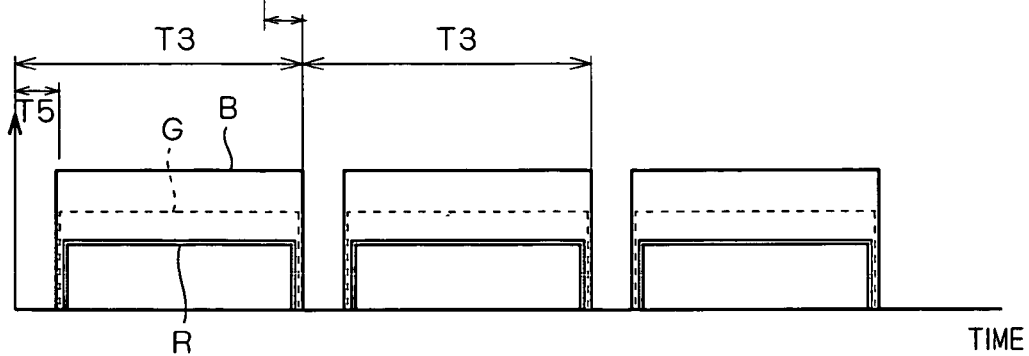

FIGS. 8A and 8B illustrate alternative timing of turning on the planar light source device according to the first preferred embodiment. FIG. 8A indicates timing of turning the light source unit 28L on, and FIG. 8B the right source unit 28R. In the turn-on timing illustrated in FIGS. 8A and 8B, a time period T3 includes a turn-on period and a turn-off period, so the turn-on frequency f is expressed by the equation, f=1/T3. Namely, as illustrated in FIG. 8A, the light source unit 28L is driven with such timing that all the R, G and B LEDs 26 are turned on at the beginning of the time period T3, which is followed by a time period T4, or a turn-off period, at the end. Meanwhile, as illustrated in FIG. 8B, the light source unit 28R is driven with such timing that a time period T5, or a turn-off period, is provided at the beginning, and all the R, G and B LEDs 26 are turned off at the end of the time period T3. The luminance is adjusted by a current again in the light source units 28 in this case.

When turning the LEDs 26 on for 95% of the time period T3, the time periods T4 and T5 which are turn-off periods are expressed by the equation, (1−0.95)×T3. For the time period T5 during which the LEDs 26 of the light source unit 28R are turned off, light from the LEDs 26 of the light source unit 28L is detected. Conversely, for the time period T4 during which the LEDs 26 of the light source unit 28L are turned off, light from the LEDs 26 of the light source unit 28R is detected.

Although the light source units 28 are provided on both sides of the light guiding plate 23 in the planar light source device according to this preferred embodiment, alternatives are that three or more light source units 28 are provided in order to further improve the emission luminance of the device, or a single light source unit 28 is provided.

Further, although the above-described light source units 28 are driven and controlled as a single unit, the light source units 28 may alternatively be divided into a plurality of light source drive-control blocks, to be driven and controlled by the block. Each block is driven with the turn-on timing as is illustrated in FIGS. 7A and 7B, or FIGS. 8A and 8B. More specifically, when one light source unit 28 is provided, the light source unit 28 is divided into two light source drive-control blocks each of which is provided with a different system of power source supply path to the LEDs 26. Such configuration ensures both light-emitting and light-receiving functions of the one light source unit 28. Likewise, when two or more light source units 28 are provided, each of the light source units 28 should be divided into a plurality of light source drive-control blocks, to ensure both light-emitting and light-receiving functions of each of the light source units 28.

Also in the present invention, an LED 26 exclusively for detecting the quantity of light and not for emitting light may be mounted. Such LED 26 exclusively for detecting the quantity of light has the advantage that its light-receiving sensitivity characteristic is unaffected by heat that would be generated by light emission. In addition, mounting the LED 26 for light emission and the LED 26 for light reception on the same circuit substrate 27 simplifies assembly operations and reduces the manufacturing cost compared with separately mounting the LED 26 for light emission and a separate optical sensor on different circuit substrates.

Whereas the white light source is formed by combining the R, G and B LEDs 26 in the planar light source device according to this preferred embodiment, white LEDs 26 may alternatively be used to form the white light source.

Moreover, an optical sensor may separately be provided in addition to the LEDs 26 for light emission in the present invention. By combining information obtained by the LEDs 26 for light reception and information obtained by the separately provided optical sensor, a light emission state of the LEDs 26 can be controlled more accurately, to thereby obtain more stabilized luminance and chromaticity.

As described above, in the planar light source device according to the first preferred embodiment, the turned-off LEDs 26 detect the quantities of light from the other LEDs 26, and adjust the quantities of light of the other LEDs 26 based on that current. This attains the stabilized quantities of light emission of the LEDs, to thereby realize a planar light source device capable of obtaining stabilized luminance and chromaticity.

Second Preferred Embodiment

Figure 9:
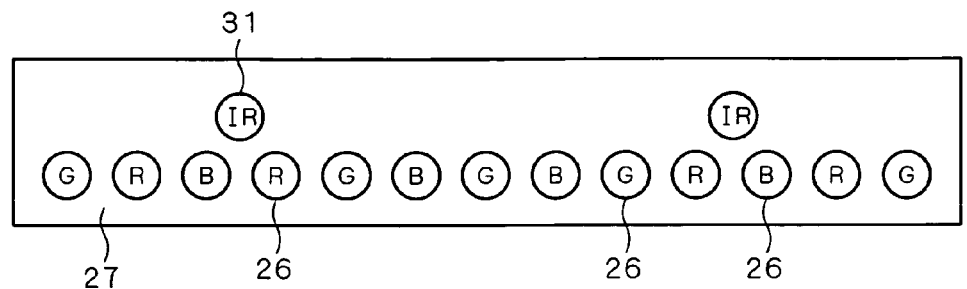
FIG. 9 is a plan view illustrating a light source unit according to a second preferred embodiment of the present invention.
Figure 10:
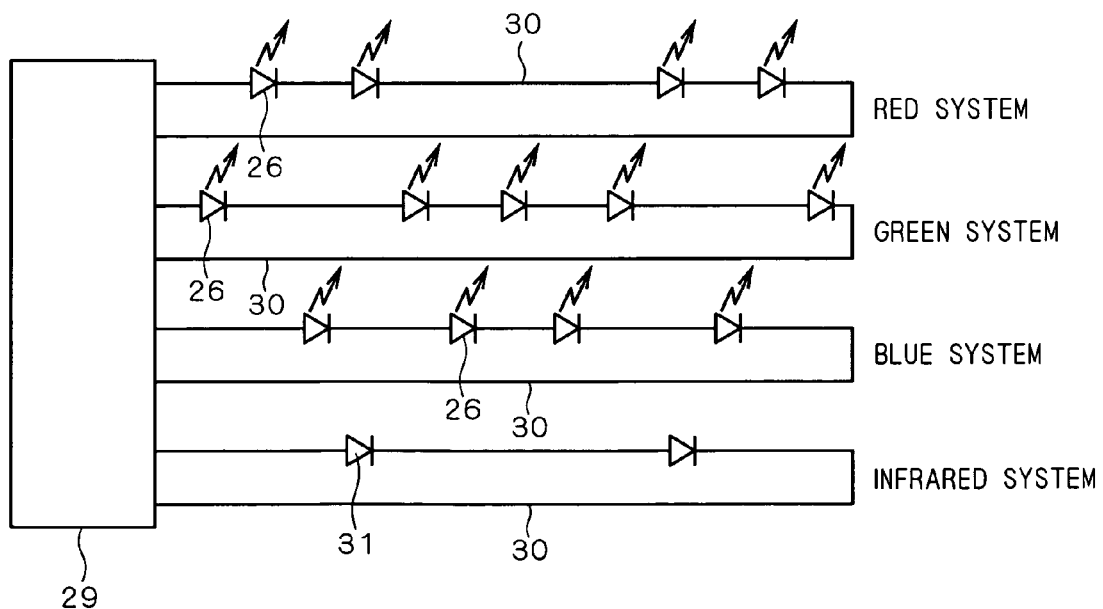
FIG. 10 is a wiring diagram illustrating the light source unit according to the second preferred embodiment.

FIG. 9 illustrates the structure of the light source unit 28 in a planar light source device according to a second preferred embodiment of the present invention. FIG. 10 is a wiring diagram of the light source unit 28 in FIG. 9. In the light source unit 28 according to the second preferred embodiment, the R, G, and B LEDs 26 are mounted in a row on the rectangular circuit substrate 27, and LEDs 31 of wavelength longer than that of the R LEDs 26 are further mounted. In FIG. 9, the LEDs 31 are provided off the upper right of the third LED 26 from the left, and off the upper left of the third LED 26 from the right. The LEDs 31 are infrared (IR) LEDs having an infrared wavelength (at least 780 nm) as a dominant wavelength. The circles indicating the LEDs 31 in FIG. 9 are labeled with "IR".

One IR LED 31 may be mounted on one light source unit 28, however at least two IR LEDs 31 should be mounted in order to detect averaging light without being affected by unevenness in color and luminance. When mounting a plurality of LEDs 31, the LEDs 31 should be connected in series as shown in FIG. 10 to improve detection accuracy. The IR LEDs 31 may be arranged in a different row from the R, G and B LEDs 26 as shown in FIG. 9, or alternatively in the same row. The IR LEDs 31 may have a different shape than those of the R, G and B LEDs 26.

As illustrated in FIG. 10, the R, G and B LEDs 26 and the IR LEDs 31 are connected in series by the wiring 30 on a color-by-color basis. Such serial connection allows the LEDs 26 and 31 to be driven with a constant current, thus making the respective quantities of light emission uniform. While the R, G and B LEDs 26 repeat the emission and reception of light in such a manner as was described in the first preferred embodiment, the IR LEDs 31 are exclusively for receiving light. The timing of detecting the quantities of light by the IR LEDs 31 may coincide with, or alternatively be different from, the timing of detecting the quantities of light by the R, G and B LEDs 26. Also, while the IR LEDs 31 are exclusively for receiving light in this preferred embodiment, the IR LEDs 31 may repeat the emission and reception of light just like the R, G and B LEDs 26 in the present invention.

FIG. 9 illustrates one light source unit 28. A plurality of light source units 28 should be arranged in the planar light source device so that the light emission and light reception are repeated among those light source units 28 to detect the respective quantities of light emission. The quantities of light emission of the LEDs 26 are then adjusted based on the detection results.

Figure 11:
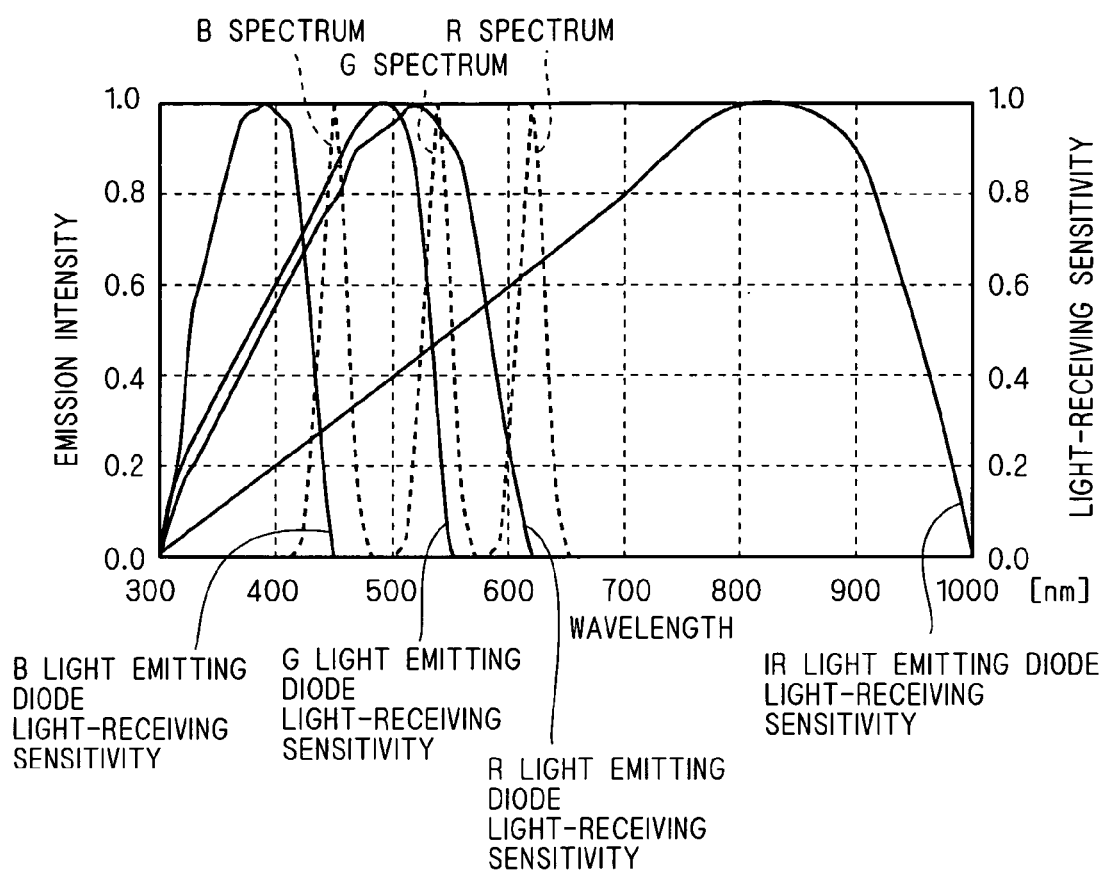
FIG. 11 explains the light-receiving sensitivity characteristics of light emitting diodes according to the second preferred embodiment.

FIG. 11 illustrates the emission spectrums of R, G and B colors, and the light-receiving sensitivity characteristics of the R, G and B LEDs 26 and IR LEDs 31. As mentioned in the first preferred embodiment, the relationship between the threshold wavelength $\lambda h$ and the band gap energy Eg of the LED 26 being used as a light-receiving element is expressed by the equation, $\lambda h=1240/Eg$. And the relationship between the emission peak wavelength $\lambda P$ and the band gap energy Eg of the LED 26 being used as a light-emitting element is also expressed by the equation, $\lambda h=1240/Eg$. Accordingly, the threshold wavelength $\lambda h$ and the emission peak wavelength $\lambda P$ are equal to each other between the LEDs 26 of the same color.

This leads to the fact that only the R LEDs 26 have a threshold wavelength $\lambda P$ capable of receiving the emission peak wavelength $\lambda P$ (which is about 630 nm in FIG. 1) from the LEDs 26 of the same R color. The light-receiving sensitivity characteristic of the R LED 26 and the emission spectrum of R partly overlap each other, as shown in FIG. 11.

As indicated in FIG. 11, the light-receiving sensitivity characteristic of the R LED 26 overlaps a large portion of each of the emission spectrums of G and B, and the light-receiving sensitivity characteristic of the G LED 26 overlaps a large portion of the emission spectrum of B. Accordingly, when G and B colors have emission spectrums that only partly overlap the light-receiving sensitivity characteristics of the same colors and cannot be received sufficiently, the LEDs 26 of another color can compensate for the insufficient reception.

With respect to the R emission spectrum, however, the light reception cannot be compensated for by the LEDs 26 of another color. This causes wider variations in the R emission spectrum detection when luminance is reduced by way of light control and the like, making the control of emission luminance and chromaticity of the planar light source unstable.

For this reason, the planar light source device according to this preferred embodiment has the IR LEDs 31 shown in FIG. 9 provided in the light source unit 28. The IR LED 31 has a light-receiving sensitivity characteristic whose threshold wavelength $\lambda h$ is 1000 nm, as indicated in FIG. 11, which overlaps a large portion of the R emission spectrum. Consequently, the variations in the R emission spectrum detection get narrower compared with when providing only the R, G and B LEDs 26, stabilizing the control of emission luminance and chromaticity of the planar light source.

Further, the planar light source device according to the second preferred embodiment, which uses four types of LEDs 26 as light-receiving elements, attains improved accuracy of light reception compared with when using three types of LEDs 26 as light-receiving elements. The emission peak wavelength $\lambda P$ of the LED 26 shifts with the temperature of the LED 26. The amount of shift of the emission peak wavelength $\lambda P$ needs to be accurately detected in order for a planar light source device to obtain accurate and stabilized luminance and chromaticity. However, the accurate detection of the amount of shift of the emission peak wavelength $\lambda P$ has been difficult when using three types of LEDs 26 as light-receiving elements. When using four types of LEDs 26 as light-receiving elements as in this preferred embodiment, the amount of shift of the emission peak wavelength $\lambda P$ can be accurately detected by using the results detected by the LEDs 31 other than the light-emitting elements.

While the IR LEDs 31 are used in the second preferred embodiment, photodiodes and the like exclusively for detecting light may alternatively be used in the present invention. It is required of such photodiodes and the like to have a light-receiving sensitivity characteristic capable of detecting a wavelength longer than the threshold wavelength λh of the R LED 26. Alternatively, two or more types of LEDs 31 having different light-receiving sensitivity characteristics may be provided in addition to the LEDs 26 acting as light-emitting elements. That will provide a planar light source device capable of further accurately controlling the luminance and chromaticity.

By using the planar light source device described in the first or second preferred embodiment as a backlight, and providing a display element for displaying a desired image thereon, a display device capable of obtaining stabilized luminance and chromaticity can be provided. A non-light-emitting display element such as a liquid crystal display element may be used as the display element.

While the invention has been shown and described in detail, the foregoing description is in all aspects illustrative and not restrictive. It is therefore understood that numerous modifications and variations can be devised without departing from the scope of the invention.

What is claimed is:

1. A planar light source device comprising:
   a light source section having a plurality of light emitting or laser diodes as a light source; and
   a light guiding section guiding light from said light source section to emit planar light, wherein
   said plurality of light emitting or laser diodes serve as light sources when turned on and as light sensors when turned off, and
   those of said plurality of light emitting or laser diodes which are turned off detect the quantities of light from those of said plurality of light emitting or laser diodes which are turned on and adjust the quantities of light emission of said those of said plurality of light emitting or laser diodes which are turned on based on the detected quantities of light.

2. The planar light source device according to claim 1, wherein said light emitting or laser diodes repeat a turn-on period and a turn-off period at a predetermined timing.

3. The planar light source device according to claim 1, wherein said first light source section includes a plurality of said light emitting or laser diodes emitting lights of different wavelengths, said light emitting or laser diodes in said first light source section being turned off detecting the quantities of light from said light emitting or laser diodes in said second light source section and adjusting the quantities of light emission of said light emitting or laser diodes in said second light source section based on the detected quantities of light with respect to each of said wavelengths.

4. The planar source device according to claim 3, wherein said light source section includes said light emitting or laser diodes emitting light of monochromatic wavelength of red, blue, and green.

5. A planar light source device comprising:
   a first light source section having a plurality of light emitting or laser diodes as a light source;
   a second light source section having a plurality of light emitting or laser diodes as a light source; and
   a light guiding section guiding light from said first light source section to said second light source section and from said second light source section to said first light source section to emit planar light,
   wherein
   said light emitting or laser diodes from said first light source section being turned off detect the quantities of light from said light emitting or laser diodes in said second light source section and adjust the quantities of light emission of said light emitting or laser diodes in said second light source section based on the detected quantities of light;
   said first light source section includes said light emitting or laser diodes emitting light of a monochromatic wavelength of red, blue and green; and
   said first light source section further includes said light emitting or laser diodes emitting light of a wavelength longer than said monochromatic wavelength of red.

6. The planar light source device according to claim 5, wherein said light of a wavelength longer than said monochromatic wavelength of red is infrared light.

7. The planar light source device according to claim 1, wherein
   said light source section is divided into at least two light sources drive-control blocks, said light emitting or laser diodes emitting light and detecting the quantities of light with respect to each of said light source drive-control blocks.

8. The planar light source device according to claim 5, wherein said light emitting or laser diodes of said first light source section detect, upon being turned off, the quantities of light received from said light emitting or laser diodes of said second light source section and adjust the quantities of light emission of said light emitting or laser diodes of said second light source section based on the detected quantities of light.

9. A planar light source device comprising:
   a first light source section having a plurality of light emitting or laser diodes as a light source;
   a second light source section having a plurality of light emitting or laser diodes as a light source; and
   a light guiding section guiding light from said first light source section to said second light source section and from said second light source section to said first light source section to emit planar light,
   wherein
   said light emitting or laser diodes from said first light source section being turned off detect the quantities of light from said light emitting or laser diodes in said second light source section and adjust the quantities of light emission of said light emitting or laser diodes in said second light source section based on the detected quantities of light;
   said first light source section includes said light emitting or laser diodes emitting light of a monochromatic wavelength of red, blue and green; and
   said light emitting or laser diodes of said first light source section repeat a turn-on period and a turn-off period at a predetermined timing with respect to said light emitting or laser diodes of said second light source section.

10. The planar light source device according to claim 9, wherein said light emitting or laser diodes of said first light source section repeat said turn-on period and turn-off period overlapping said light emitting or laser diodes of said second light source section for a predetermined period.

11. A display device comprising a planar light source device including:
   a first light source section having a plurality of light emitting or laser diodes as a light source;
   a second light source section having a plurality of light emitting or laser diodes as a light source; and
   a light guiding section guiding light from said first light source section to said second light source section and from said second light source section to said first light source section to emit planar light, wherein
said light emitting or laser diodes from said first light source section being turned off detect the quantities of light from said light emitting or laser diodes in said second light source section, and adjust the quantities of light emission of said light emitting or laser diodes in said second light source section based on the detected quantities of light, and a display element arranged on an emission surface side of said planar light source device, for displaying a desired image;

said first light source section includes said light emitting or laser diodes emitting light of a monochromatic wavelength of red, blue and green; and said first light source section further includes said light emitting or laser diodes emitting light of a wavelength longer than said monochromatic wavelength of red.

12. The display device according to claim 11, wherein said display element is a liquid crystal display element.

* * * * *